Figure 3:
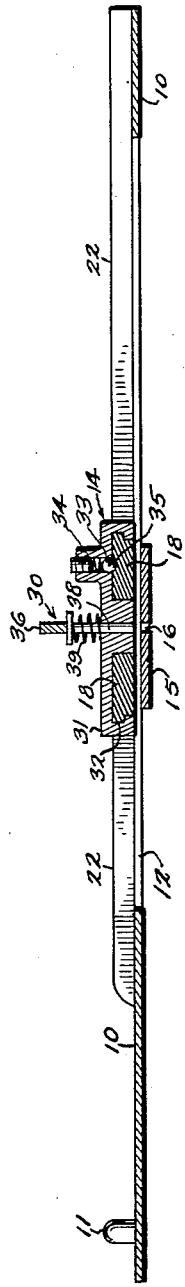

March 19, 1957  M. O. JONES  2,785,751
CARD PERFORATING DEVICES
Filed Oct. 9, 1953  3 Sheets-Sheet 1
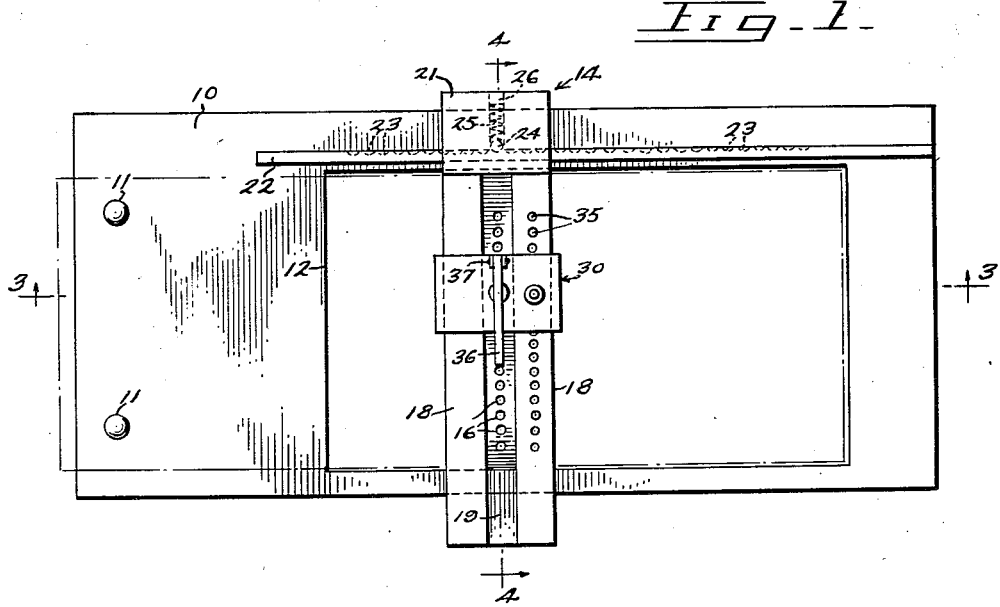
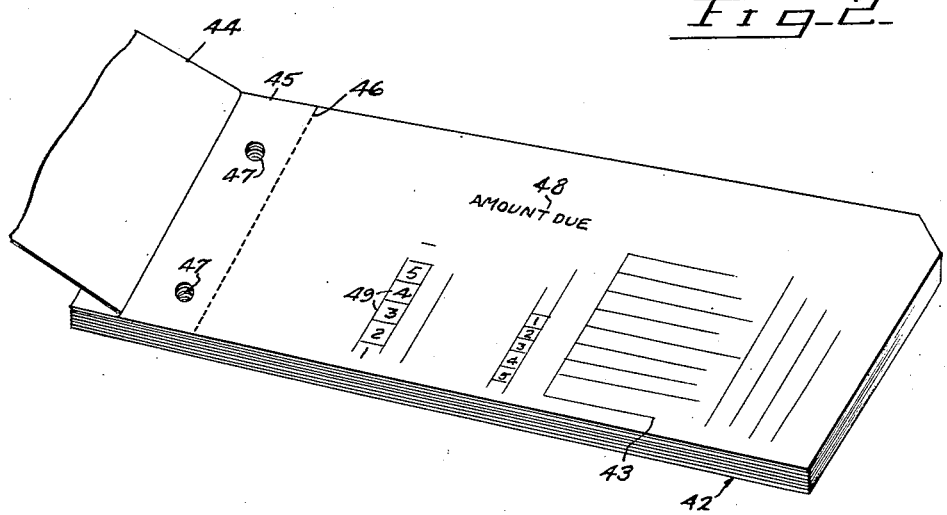
INVENTOR
MONTGOMERY OSBORNE JONES
BY *John V. Phillips*
ATTORNEY March 19, 1957

M. O. JONES 2,785,751

CARD PERFORATING DEVICES

Filed Oct. 9, 1953

3 Sheets-Sheet 2

INVENTOR
MONTGOMERY OSBORNE JONES

BY *John V. Phillips*

ATTORNEY

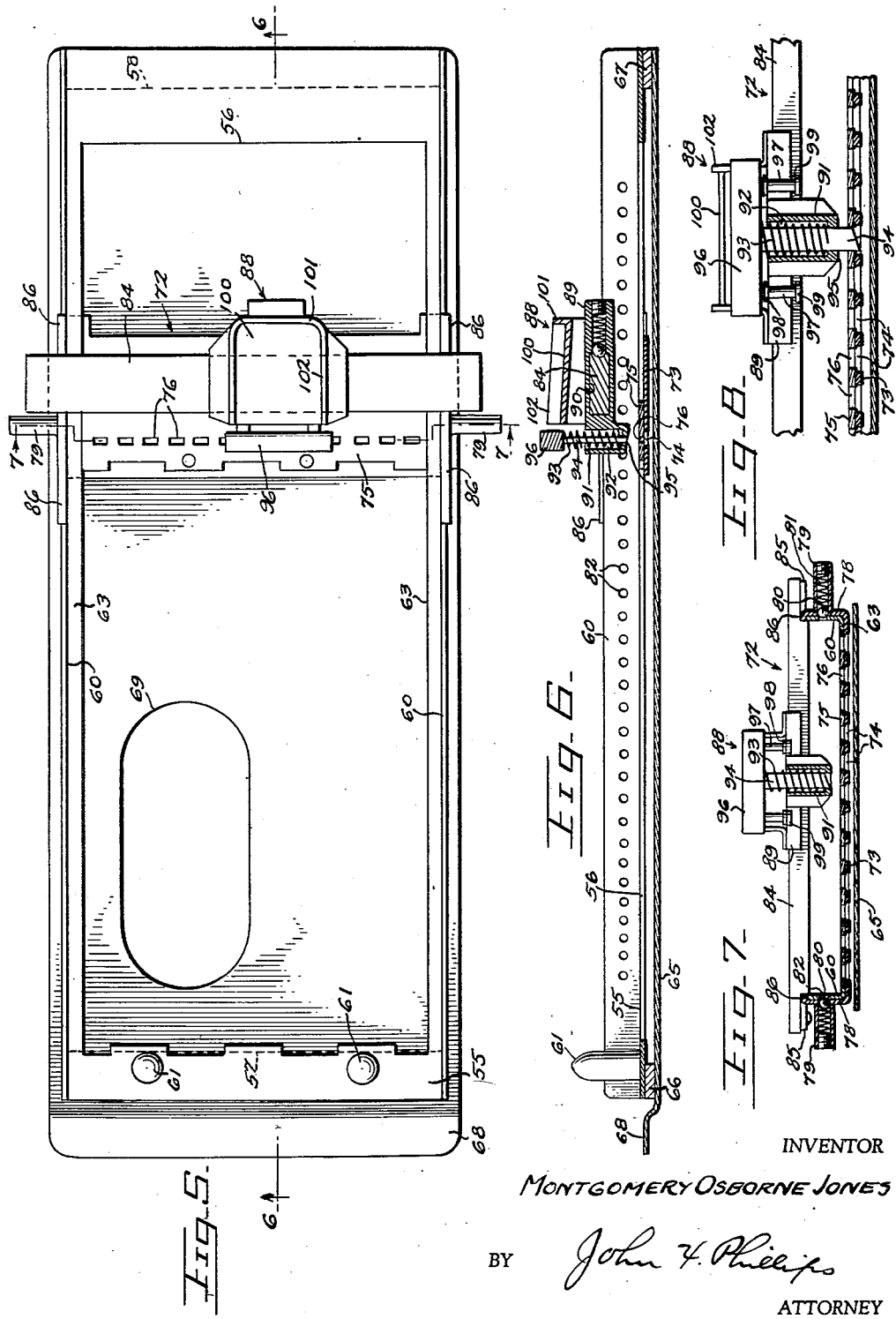

2,785,751

CARD PERFORATING DEVICES

Montgomery Osborne Jones, Richmond, Va., assignor to G. Tucker Smith, Coleman Wortham, Jr., and Fielding L. Williams, Richmond, Va., trustees Application October 9, 1953, Serial No. 385,203

10 Claims. (Cl. 164—86)

This invention relates to card perforating devices and is a continuation-in-part of my application Serial No. 176,365, filed July 28, 1950, and now abandoned.

Business machines for bookkeeping and various record keeping purposes are now in wide general use. One of the elements used in such machines is a card which must be punched accurately at predetermined points to be passed through the machines for the automatic recording of data represented by the particular positions of the punched openings in the cards. The machines used for this purpose are quite expensive to purchase or rent, and their value is minimized by the great amount of time frequently required in hand-kept book work before records can be prepared on automatic business machine cards.

For example, collectors of insurance premiums carry with them record books in which each premium collection is recorded by hand, while at the same time, the collector furnishes the insured with a receipt, usually by making an entry in a receipt book issued to the insured. Many hours of work are required each month for the transferring of the collector's records to record sheets which are forwarded to the home office of the insurance company for the preparation therefrom of business machine cards perforated in accordance with the data submitted by the collector. The machine operators are called upon to read many different types of handwriting, thus introducing a substantial percentage of error in the punching of record cards.

An important object of the present invention is to provide a novel, highly portable punching device by which business machine cards can be quickly and easily punched and wherein the punching may be done on single cards or in duplicate or in triplicate, thus providing the necessary number of records for various purposes, such as the leaving of a card with an insurance policy holder as a receipt, the retaining of a card by the collector and the forwarding of the card to the home office, thus eliminating substantial handwritten record keeping and eliminating the very substantial time and expense involved in the punching of the cards from handwritten records.

A further object is to provide such a device which is relatively flat and of an over-all size not substantially exceeding the size of the card to be punched, thus rendering it highly practicable for an insurance collector, for example, to carry the punch with him when collecting insurance premiums.

A further object is to provide a highly simplified arrangement of parts involving a longitudinally movable carriage slidably connected to the body of the device, and a transversely movable punch unit mounted on the carriage whereby the punch element of the punch unit may be moved into any desired position over a point in any line or column on the card, the facility and operation of the device being such that numerous perforations in the cards to record all of the desired data may be carried out in a matter of a few seconds.

A further object is to provide such a device wherein longitudinal and transverse sliding movements of the carriage and punch are accurately guided and wherein detent means assist in positioning the punch element wherever desired, thus providing a highly accurate punching of the card to provide a resultant card which may be used as easily in a recording machine as a card punched on a large punching machine usually employed for this purpose.

Other objects and advantages of the invention will become apparent during the course of the following description.

In the drawings I have shown two embodiments of the invention. In this showing

Figure 4:
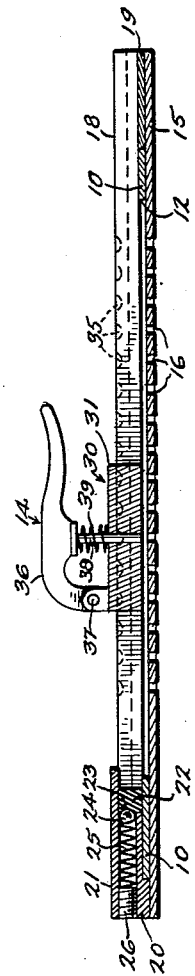

Figure 1 is a plan view of one form of the device,

Figure 2 is a perspective view illustrating a book of cards bearing indicia thereon representing the various items which may be recorded by the perforating of the cards, the cover of the book being broken away, Figure 3 is a longitudinal sectional view on line 3—3 of Figure 1, Figure 4 is a transverse sectional view on line 4—4 of Figure 1, Figure 5 is a plan view of a modified form of the device, Figure 6 is a longitudinal sectional view on line 6—6 of Figure 5, Figure 7 is a transverse sectional view on line 7—7 of Figure 5, and Figure 8 is an enlarged fragmentary sectional view corresponding to the central portion of Figure 7 showing the punch element in operative position.

Referring to Figures 1, 3 and 4, the numeral 10 designates the body of the device illustrated in the form of a flat plate of rectangular shape. One end of said plate is provided with a pair of upstanding studs 11 preferably having rounded upper ends as shown in Figure 3 for a purpose to be described. The plate 10 is provided with a relatively large rectangular opening 12, preferably of a length and width to extend beyond all of the indicia on the card to be punched with the device.

A carriage indicated as a whole by the numeral 14 is mounted for longitudinal sliding movement relative to the body plate 10. This carriage comprises a lower, relatively narrow plate 15 slidable against the bottom of the plate 10 and extending beyond the longitudinal edges thereof as shown in Figure 4. The plate 15 is provided with a plurality of die openings 16 corresponding to the positions of the rows of indicia on the card to be punched.

A pair of spaced parallel rails 18 extend transversely of the body plate 10 and beyond the edges thereof and are connected in any suitable manner to the plate 15 with spacers 19 and 20 interposed therebetween beyond the respective longitudinal edges of the plate 10 as shown in Figure 4. A block 21 is arranged above one edge of the body plate 10 and is fixed to the spacer 20 to slide with the carriage as a part thereof and is secured to the rails 18. Adjacent and beneath the block 21 is arranged a bar 22 fixed to the body plate 10 and extending longitudinally thereof as shown in Figure 1. The bar is provided with a plurality of substantially hemispherical recesses 23 engageable by detent ball 24 mounted in the block 21 and urged toward the bar 22 by a spring 25 backed up by a screw plug 26. Ball 24 is engageable in any notch 23 to position the carriage 14 longitudinally of the body plate 10. A punch unit indicated as a whole by the numeral 30 is carried by the carriage 14 and comprises a plate 31 arranged transversely of the rails 18 and grooved as at 32 to fit these rails and slide therealong. The plate 31 carries a ball detent 33 urged downwardly by a spring 34 to selectively engage substantially hemispherical notches 35 formed in the upper face of one of the rails 18. The plate 30 carries a punch lever 36 pivoted thereto as at 37 and engaging the top of a punch element 38, the lever 36 being normally supported by a spring 39 to maintain the punch element 38 with its lower end flush with or slightly higher than the bottom surface of the central portion of the plate 31, as shown in Figure 3. It will be apparent that the detent ball 33 is engageable in any selected notch 35 to position the punch element in alignment with any row of indica on the card to be punched. The detent ball 24 is engageable in any notch 23 to position the punch element 38 in alignment with any column of indicia on the card.

The device is adapted to be used in conjunction with a book 42 of cards 43, and the book may have a cover 44. Each card carries a stub 45 from which the card is separable by tearing along a perforated line 46. All of the cards of the book are punched therethrough to provide openings 47 corresponding in shape, size and arrangement to the studs 11 to receive such studs when the device is to be used, as further described below. Each card 43 is provided with indicia 48 associated with rows and columns of numbers 49.

Each card, in the form of the invention shown in Figures 1 to 4, inclusive, is of a width slightly less than the width of the opening 12. In the use of the device, the body plate 10 is placed beneath one or more cards 40 with the studs 11 arranged in the openings 47, and the card is adapted to lie within the opening 12 as to all portions of the card containing indicia which it may be desired to perforate.

In Figures 5 to 8, inclusive, there is shown a modified form of the invention. In such form, the device is provided with a body plate 55 having a relatively large rectangular opening 56 which is preferably of a smaller transverse width than the card and of a greater longitudinal length of the card whereby the ends of the latter, indicated by the dotted lines 57 and 58, will be supported on the body plate 55. Referring to Figure 7, it will be noted that the plate 55 is provided with upstanding longitudinal flanges 60. These flanges are spaced apart a distance equal to the width of the card to be punched and serve to assist in positioning each card in the device in conjunction with studs 61, corresponding to the studs 11 previously described. Since the opening 56 is of less width than the card and is of a width less than the distance between the flanges 60, the body plate 55 will be provided throughout the length of the opening 56 with longitudinal side flanges 63 which assist the end portions of the body plate 55 in supporting each card in position.

The modified form of the device is preferably provided with a bottom plate 65 and between the ends of this plate and the plate 55 are arranged spacers 66 and 67. Adjacent the spacer 66 and beyond the adjacent end of the plate 55, the plate 65 is provided with an upwardly offset lip 68 to facilitate the picking up of the device from a table or other supporting surface on which the device may be used. The plate 65 is provided with an opening 69 for the insertion of a thumb or finger of the operator to push upwardly on a punched card to facilitate the removal thereof.

A carriage indicated as a whole by the numeral 72 is mounted for longitudinal sliding movement relative to the body 55. The carriage comprises a bottom plate 73 extending transversely under the plate 55 in contact with the flanges 63 thereof and provided with openings 74 for a purpose to be described. To the top of the plate 73 is secured a die plate 75 provided with die openings 76 arranged in alignment with the openings 74 as shown in Figure 7, so that punchings from a card will pass through the plate 73 into the space between this plate and the bottom plate 65, from which space, the punchings may be discharged merely by tilting the device edgewise.

The die plate 75 is relatively narrow as shown in Figure 6, but the plate 73 is preferably somewhat wider to provide bearing surfaces of greater area engageable with the bottom of flanges 63 and to provide for relatively wide upstanding flanges 78, integral with the plate 73, and slidable over the outer surfaces of the flanges 60. The flanges 78 are provided with outstanding tubular members 79 carrying ball detents 80 urged inwardly by springs 81 into engagement with selected openings 82 formed in the flanges 60. The ball detents 80 are operative for positioning the carriage 72 in selected positions longitudinally along the body 55.

The carriage 72 further comprises a top rail 84 extending transversely of the device and projecting beyond the flanges 78. These flanges terminate in upper outwardly extending horizontal flanges 85 to which the ends of the rail 84 are connected. Beyond the ends of the flanges 85, the upper edges of the flanges 78 are turned inwardly as at 86 and slide on the upper extremities of the flanges 60.

A punch unit indicated as a whole by the numeral 88 is slidable along the rail 84. The punch unit comprises a body 89 having an opening 90 therethrough slidably receiving the rail 84. The body 89 is provided at one edge of the rail 84 with an overhanging portion 91 having a vertical recess 92 in which is arranged a spring 93 surrounding a punch element 94 extending through an opening in the bottom wall 95 of the recess 92. A depressible finger piece 96 is carried by the upper end of the punch element 94 and is provided with depending pins 97 operating in guides 98 carried by the body 89 and headed at their lower ends as at 99 to limit upward movement of the finger piece 96. The body 89 has connected thereto a saddle 100 in which a finger or thumb of the operator may be arranged to facilitate pushing the carriage longitudinally and transversely of the device. The saddle is provided with a flange 101 at the side thereof opposite the finger piece 96 and is provided with side flanges 102, these flanges and the finger piece 96 extending above the bottom of the saddle 100 providing finger-engaging portions through which the punch unit may be moved in any direction.

Operation

The operation of the form of the device shown in Figures 1, 3 and 4 is as follows. Assuming that the device is to be used to record the collection of premiums on an insurance policy, the collector will call on the insured, collect the amount due on one or more policies, and then proceed to punch one or more of the cards. One or more cards may be punched simultaneously for the duplicate recording of the collected premiums, depending upon the number of copies desired. Assuming that one card is to be punched, the collector will fold back the book cover 44 (Figure 2) and then will lift the uppermost card 43 and insert the left-hand end of the device as viewed in Figure 1 beneath such lifted card, moving the device toward the left until the studs 11 register with the openings 47. This operation, of course, will be performed with the carriage 14 moved to its extreme right-hand position.

Cards used in connection with the insurance business will bear a number of columns and rows of indicia in accordance with the data to be punched, for example, the amounts of the collections in dollars and cents, the number of weeks paid, etc. In operating the device, the operator will move the carriage 14 longitudinally of the body plate 10 until the punch element 38 is arranged over the desired column of indicia. The detent ball 24 will snap into one of the recesses 23 to accurately position the carriage longitudinally of the body. The punch unit 30 then will be moved transversely of the card to position the punch element 38 over the desired row of indicia, and the punch element will now be in position directly over the desired number or other indication to be punched. The operator will then push downwardly on the free end of the lever 36 to punch the card and will then release the lever. The same operation is repeated until all of the desired indicia to be recorded have been punched from the card. The card, of course, during the punching operations, will have the portion thereof being punched supported on the plate 15. After the punching operations have been completed, the punched card will be removed from the device together with the book, whereupon, the card may be detached from its stub 45 by tearing along the perforated line 46. Adequate bearing surfaces obviously are provided between the carriage and the body plate 10 and between the punch unit and the rails 18 to prevent any appreciable lost motion between the parts, and accordingly, each perforation will be effected accurately at the desired point so that the resultant punched card may be passed directly through a recording machine.

The operation of the form of the device in Figures 5 to 8, inclusive, is substantially identical with that previously described. This form of the invention is advantageous over the form previously described as to certain features of construction. For example, the studs 61 are not wholly depended upon for the accurate positioning of a card to be punched, since the edges of the card will be held accurately in position by engagement thereof with the flanges 60. This completely eliminates any possible error in the location of the card in the device. Moreover, it will be apparent that the device in Figures 5 to 8, inclusive, may be used with cards of predetermined size without the punching of openings from the studs 61. A card of the proper size, separated from a book, may be accurately positioned by placing the left-hand end 57 thereof (Figure 5) against the right-hand sides of the studs 61. Thus, the card will be positioned endwise by the studs 61 and will be positioned transversely by the flanges 60.

The placing of the punch element 94 in a position beyond one edge of the rail 84 renders the different indicia to be punched highly visible, thus eliminating any possible errors in the punching of the cards at the desired points. Attention also is invited to the fact that the die plate 75 is arranged wholly within the opening 56 directly in the plane of the flanges 63. Thus, a card to be punched will have its longitudinal edge portions supported on the flanges 63 and the portions of the cards being punched will be directly supported by the die plate 75.

The punching operation is carried out in the same manner as previously described. A card having been placed in the device with the carriage 88 moved to its extreme right-hand limit of movement with the right-hand edge of the die plate 75 (Figure 6) engaging the right-hand limit of the opening 56, the carriage may be moved to the left to position the die element 94 over any desired column of indicia. The thumb of the operator, placed in the saddle 100, may be used to effect this longitudinal movement of the carriage, after which, with the thumb remaining in such position, the punch unit 88 may be moved transversely of the card to align the punch element 94 with any row of indicia. Sliding the thumb slightly to the left in Figure 5 over the top of the finger piece 96, the operator will then depress this finger piece to the position shown in Figure 8 to punch an opening in the card. The operator will then slide his thumb back into the saddle, releasing the finger piece 96 for upward movement, whereupon, the carriage and punch unit may be moved to the next position to be punched.

Thus, in a matter of seconds, with either form of the device, a substantial number of openings may be punched in a card to provide the latter with the desired data to be recorded. Actually, it requires less time to record the desired information on a card with the present device than with a pen or pencil. This is particularly true in view of the fact that to avoid errors, the hand writing of the items to be entered on a card must be relatively slowly and carefully done.

As stated, the device is not substantially larger in area than a card to be punched, and is relatively light. Accordingly, either form of the device readily may be carried from place to place to be used in recording insurance premium collections or for any other purpose.

It is to be understood that the forms of the invention shown are to be taken as illustrative only, and that the scope of the invention is defined in the appended claims.

I claim:

1. A device for perforating a card having indicia thereon arranged in rows and columns comprising a card-supporting substantially rectangular body having a portion adapted to be arranged beneath the card and extending longitudinally of and in predetermined relation to the card, a carriage extending transversely of said body and engaging longitudinal edge portions thereof to be guided for longitudinal movement therealong, said carriage being provided with top and bottom portions lying respectively above and below and extending entirely across said body and end portions lying outwardly of the longitudinal edges of said body and connecting said top and bottom portions to form therewith a rigid unit movable longitudinally of said body, a punch device carried by said top portion of said carriage and mounted for sliding movement therealong transversely of said body, said punch device having a punch element, said bottom carriage portion being slidable beneath the card and having a single line of die openings aligned transversely of said body, detent means for positioning said punch element longitudinally of said body in alignment with columns of the indicia on the card, and detent means cooperating between said punch device and said carriage for positioning said punch element in alignment with selected rows of indicia on the card.

2. A device for perforating a card having indicia thereon arranged in rows and columns, comprising a relatively stationary support having a flat card-supporting body provided with an opening of substantial size therethrough, said support having portions engaging and positioning the card thereon in a predetermined relation thereto, the opening in said body being shorter than the card whereby portions of both ends thereof will be supported on said body, a carriage extending transversely of said body and slidably engaging longitudinal edge portions and top and bottom surfaces thereof to be guided for longitudinal movement therealong, said carriage having top and bottom portions lying respectively above and below and extending entirely across said body, said top and bottom portions being fixed to each other outwardly of the longitudinal edges of said body to form a rigid unit slidably movable longitudinally of said body, and a punch device carried by said top portion of said body and mounted for sliding movement therealong transversely of said body, said punch device having a single punch element, said bottom portion of said carriage being slidable beneath the card and having a single line of die openings aligned transversely of said body, the portion of said carriage having said die openings being movable within the longitudinal limits of the opening in said body to punch portions of the card lying within such limits.

3. A device for perforating a card having indicia thereon arranged in rows and columns, comprising a relatively stationary support having a flat card-supporting body provided with an opening of substantial size therethrough, said support having portions engaging and positioning the card thereon in a predetermined relation thereto, the opening in said body being shorter than the card whereby at least one end thereof will be supported on said body, a carriage extending transversely of said body and slidably engaging longitudinal edge portions and top and bottom surfaces thereof to be guided for longitudinal movement therealong, said carriage having top and bottom portions lying respectively above and below and extending entirely across said body, said top and bottom portions being fixed to each other outwardly of the longitudinal edges of said body to form a rigid unit slidably movable longitudinally of said body, a punch device carried by said top portion of said body and mounted for sliding movement therealong transversely of said body, said punch device having a single punch element, said bottom portion of said carriage being slidable beneath the card and having a single line of die openings aligned transversely of said body, the portion of said carriage having said die openings being movable within the longitudinal limits of the opening in said body to punch portions of the card lying within such limits, detent means for positioning said punch element longitudinally of said body in alignment with columns of indicia on the card, and detent means cooperating between said punch device and said carriage and positioning said punch element in alignment with selected rows of indicia on the card.

4. A device for perforating a card having indicia thereon arranged in rows and columns, comprising a relatively stationary support having a flat card-supporting body provided with an opening of substantial size therethrough, said support having portions engaging and positioning the card thereon in a predetermined relation thereto, the opening in said body being shorter than the card whereby at least one end thereof will be supported on said body, a carriage extending transversely of said body and slidably engaging longitudinal edge portions and top and bottom surfaces thereof to be guided for longitudinal movement therealong, said carriage having top and bottom portions lying respectively above and below and extending entirely across said body, said top and bottom portions being fixed to each other outwardly of the longitudinal edges of said body to form a rigid unit slidably movable longitudinally of said body, and a punch device carried by said top portion of said body and mounted for sliding movement therealong transversely of said body, said punch device having a single punch element, said bottom portion of said carriage being slidable beneath the card and having a single line of die openings aligned transversely of said body, the portion of said carriage having said die openings being in the form of a flat plate movable parallel to and adjacent the plane of said body within the longitudinal limits of the opening therethrough.

5. A device for perforating a card having indicia thereon arranged in rows and columns, comprising a substantially rectangular card-supporting body on which the card is adapted to be arranged and having portions engageable with the card to hold it in predetermined relation thereto, said body being provided with a relatively large opening therethrough beyond at least one end of which the card projects, the width of said opening being less than the width of the card whereby longitudinal edge portions of said card will be supported by said body, and a carriage longitudinally slidable along said body, said carriage comprising a die plate lying in a plane adjacent the plane of said body and slidable beneath the card and provided with a single line of die openings spaced transversely of said body, and a punch device slidable transversely of said body and comprising a vertically movable punch element projectable through any of said die openings, and a finger piece arranged over and engageable with said punch element.

6. A device for perforating a card having indicia thereon arranged in rows and columns, comprising a substantially rectangular card-supporting body on which the card is adapted to be arranged and having portions engageable with the card to hold it in predetermined relation thereto, said body being provided with a relatively large opening therethrough beyond at least one end of which the card projects, the width of said opening being less than the width of the card whereby longitudinal edge portions of said card will be supported by said body, and a carriage associated with said body, said carriage comprising upper and lower members respectively above and below said body and extending transversely of and entirely across said body and beyond the edges of said body and connected to each other outwardly of such edges, said members slidably engaging said body and said carriage having portions slidably engaging against longitudinal edge portions of said body to accurately guide said carriage for longitudinal movement along said body, a die plate fixed to said lower member, said die plate lying in the opening in said body in the plane of said body and slidable against the bottom of the card, said die plate having a single line of spaced die openings transversely of said body, a punch device carried by said upper member and mounted for sliding movement thereon transversely of said body, said punch device comprising a vertically movable punch element adapted for registration with any of said die openings, and a finger piece arranged over and engageable with said punch element, detent means for positioning said punch element in alignment with any column of indicia on the card, and detent means for positioning said punch element transversely of said body in alignment with any row of indicia on the card.

7. A device for perforating a card having indicia thereon arranged in rows and columns comprising a substantially rectangular normally horizontal body formed of flat material provided along both longitudinal edges thereof with upstanding flanges, said body having a relatively large opening therethrough beyond at least one end of which the card projects to be supported on said body, said flanges being spaced apart a distance equal to the width of the card and said opening being of a width transverse to said body less than the space between said flanges whereby said body, at opposite edges of said opening, is provided with horizontal flanges in the plane of said body and projecting inwardly from said upstanding flanges to support edge portions of the card, and a carriage mounted for longitudinal sliding movement along said body, said carriage comprising a die plate extending transversely of said body and arranged in a plane adjacent the plane of said body and slidable against the bottom of the card and provided with a single line of die openings transversely of said body, and a punch device slidable transversely of said body and comprising a vertically movable punch element adapted to be vertically aligned with any of said die openings, and a finger piece arranged over and engageable with said punch element.

8. A device constructed in accordance with claim 7 wherein said carriage comprises portions extending transversely above and below and entirely across said body and projecting beyond the longitudinal edges thereof and portions beyond such edges of the body connecting the first-named portions to each other, said carriage having portions respectively slidably contacting top, bottom, and edge portions of said body to accurately support said carriage for sliding movement longitudinally of said body.

9. Apparatus constructed in accordance with claim 7 provided with detent means cooperating between said carriage and said body to position said punch element over any row of indicia on the card, and detent means cooperating between said punch device and another portion of said carriage for positioning said punch element in alignment with any row of indicia on the card.

10. A device constructed in accordance with claim 7 wherein said carriage comprises portions extending transversely above and below and entirely across said body and projecting beyond the longitudinal edges thereof and portions beyond such edges of the body connecting the first-named portions to each other, said carriage having portions respectively slidably contacting top, bottom, and edge portions of said body to accurately support said carriage for sliding movement longitudinally of said body, said die element being fixed to the portion of said carriage extending below said body and said punch element being slidably connected to the portion of said carriage extending transversely above said body for sliding movement therealong.

References Cited in the file of this patent

UNITED STATES PATENTS

| 827,104 | MacDonald | July 31, 1906 |
| 1,742,216 | Rauber | Jan. 7, 1930 |
| 1,745,910 | Pierce | Feb. 4, 1930 |
| 1,839,415 | Schumacher | Jan. 5, 1932 |
| 2,684,717 | Jones et al. | July 27, 1954 |
| 2,694,449 | Ruffin | Nov. 16, 1954 |

FOREIGN PATENTS

| 402,909 | Great Britain | Dec. 14, 1933 |